April 6, 1954

L. P. CROSS 2,674,004

SAUSAGE LINKING MACHINE

Filed June 24, 1950

INVENTOR.
Lawrence P. Cross,
BY
Cromwell, Greist & Warden
Attys.

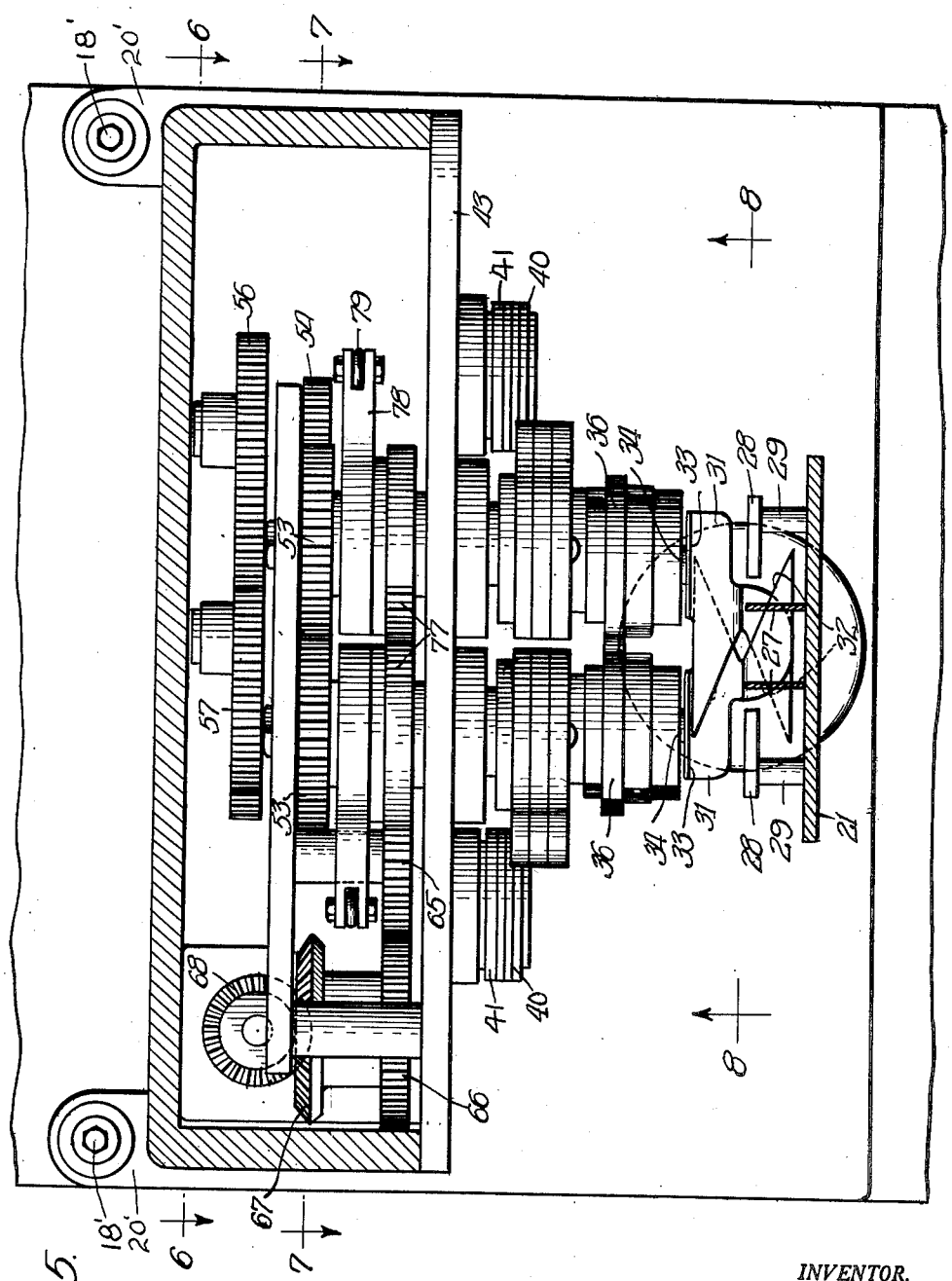

April 6, 1954

L. P. CROSS 2,674,004

SAUSAGE LINKING MACHINE

Filed June 24, 1950

INVENTOR.
Lawrence P. Cross,
BY
Cromwell, Grist-Warden
ATTYS.

April 6, 1954   L. P. CROSS   2,674,004
SAUSAGE LINKING MACHINE
Filed June 24, 1950   8 Sheets-Sheet 5

INVENTOR.
Lawrence P. Cross,
BY
Cromwell, Greist & Warden
ATTYS.

April 6, 1954

L. P. CROSS 2,674,004

SAUSAGE LINKING MACHINE

Filed June 24, 1950

INVENTOR.
Lawrence P. Cross,
BY
Cromwell, Greist & Warden
Attys.

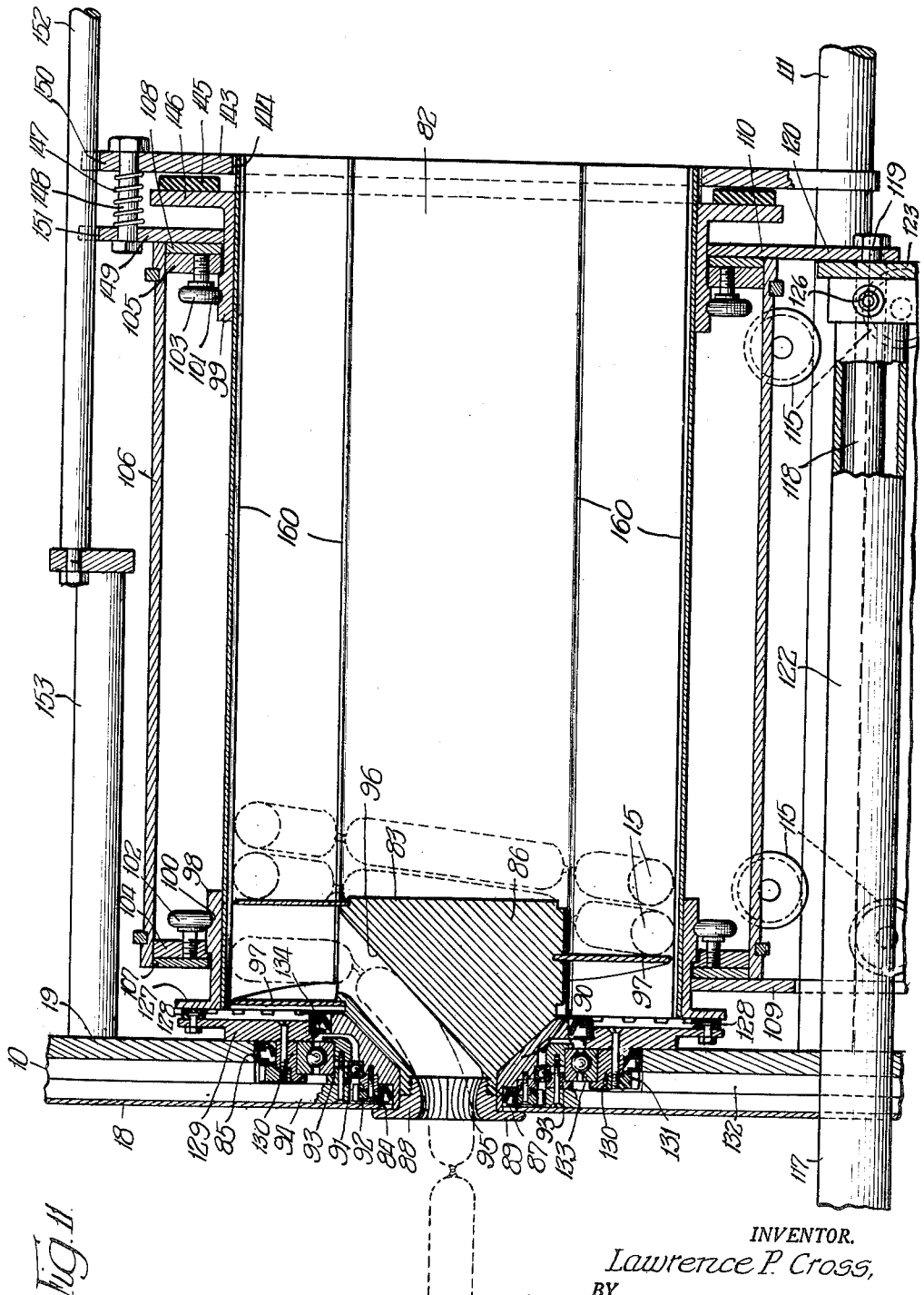

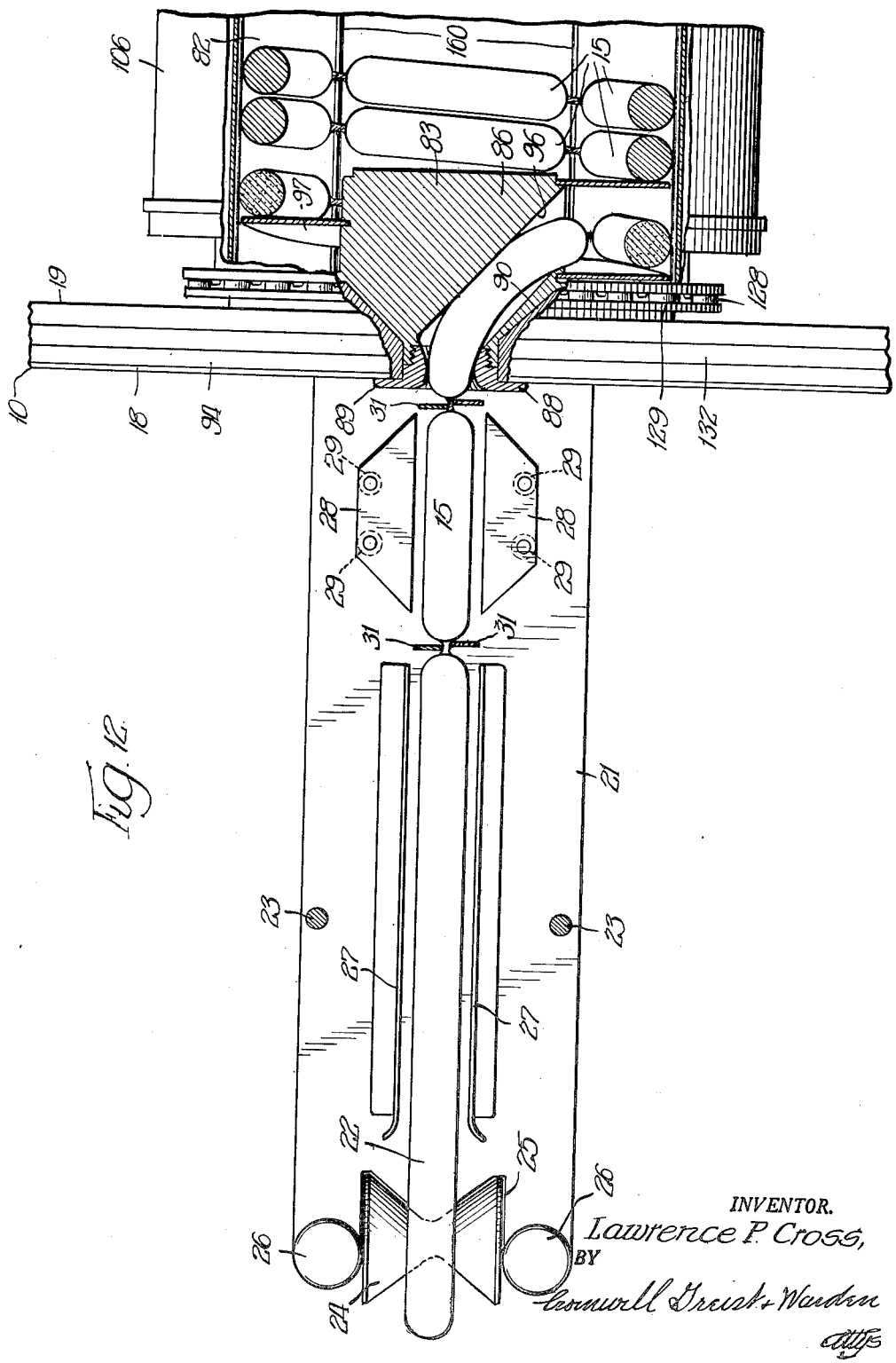

Patented Apr. 6, 1954

2,674,004

UNITED STATES PATENT OFFICE 2,674,004

SAUSAGE LINKING MACHINE

Lawrence P. Cross, Valparaiso, Ind.

Application June 24, 1950, Serial No. 170,160

30 Claims. (Cl. 17—34)

This invention relates to the manufacture of sausages of the character in which a length of filled or stuffed casing is divided into individual sausage links of generally uniform length and a twist is imparted to the casing between successive links.

It is an object of the invention to provide an improved mechanism for the production of link sausages which mechanism will divide a filled casing at predetermined intervals to form individual sausage links of uniform length and automatically rotate successive links in the same direction to provide a twist in the casing in the areas joining the links.

It is another object of the invention to provide a sausage linking machine which will automatically divide a filled sausage casing into sections of predetermined length, which will rotate each successive section to impart a twist in the casing between it and the next succeeding section, which will collect the twisted sections in coil-like fashion in a container as the twisting is completed and which will thereafter position the connected sausages, on a smoke stick ready for insertion in the smoke house.

It is a further object of the invention to provide a sausage linking machine which comprises in combination mechanism for continuously feeding a filled sausage casing, mechanism for constricting the casing at spaced points to divide the same into individual sausage links, mechanism for rotating each successive link to impart a twist in the constricted area between the links, and mechanism for collecting the twisted links into a coiled stack and for positioning the coiled stack on a smoke stick for delivery to the smoke house.

It is a more specific object of the invention to provide a sausage linking machine which comprises in combination means for continuously feeding a filled sausage casing, cooperating movable divider members for constricting the casing at spaced points to divide the same into individual sausage links, a rapidly rotating mechanism for imparting a twist in the constricted area between the successive links, a drum-like container for collecting the twisted links into a coiled stack and means for moving the container into position over a smoke stick to deliver the coil of links thereto for transfer to a smoke house.

It is a still more specific object of the invention to provide a sausage linking machine comprising means for continuously feeding a filled sausage casing, cooperating pairs of movable gripper members operable on opposite sides of the path of travel of the filled casing to engage the casing at intervals and divide the same into a plurality of links of uniform size, a continuously rotating mechanism including a drum and an apertured plate, arranged in spaced relation to the gripper members, for receiving the successive links and imparting a twist at the point where the grippers engage the casing between the successive links, and distributing mechanism cooperating with the apertured plate to arrange the twisted links in a coil-like formation in the drum.

It is another object of the invention to provide in a sausage linking machine of the type described a twisting and collecting mechanism, comprising a rotatable hub-like member having a passageway which extends from the center thereof in an axially inclined direction, a drum-like container encompassing the same, which is rotatable in the same direction but at a different speed, and a radially extending spiraled distributing plate on the hub-like member, whereby the sausage links are successively twisted as they move through the passageway and the twisted links are distributed in coil formation around the interior of the drum-like container.

It is another object of the invention to provide in a sausage linking machine mechanism for constricting a filled sausage casing at spaced intervals to divide the same into a plurality of links of predetermined length in combination with a twisting mechanism which comprises a rapidly revolving tube-like receptacle which is open at its ends and mounted for reciprocable movement in an axial direction with the axis of rotation aligned with the constricting mechanism, a rapidly revolving hub-like member having its axis of rotation aligned with the restricting mechanism and provided with a passageway extending from the center of the end adjacent the constricting mechanism at an oblique angle to the axis of rotation thereof and terminating on the peripheral surface adjacent the other end of the member, a screw-like distributing vane on the periphery of the hub-like member and a rotatable plate associated with the hub-like member which is adapted for separable connection with the tube-like receptacle when the latter is at one end of its axial movement whereby the sausage casing is subjected to a substantially continuous rotating operation in one direction to impart a twist in the casing between successive sausage links as they are formed by the constricting mechanism and whereby the connected links are distributed in coil-like fashion around the interior of the tube-like receptacle, the latter being axially reciprocated upon completion of the twisting operation to position the coil of sausage links for delivery onto a smoke stick.

These and other objects of the invention will be apparent from a consideration of the linking machine which is shown by way of illustration in the accompanying drawings, wherein:

Fig. 4 is a transverse section taken generally on the line 4—4 of Fig. 1;

Fig. 5 is a view taken on the line 5—5 of Fig. 1 to a scale enlarged approximately four times and showing the divider mechanism;

Fig. 11 is a partial longitudinal section through the twisting and distributing mechanism; and Fig. 12 is a partial plan view of the machine with portions in section and with other portions broken away.

Figure 1:
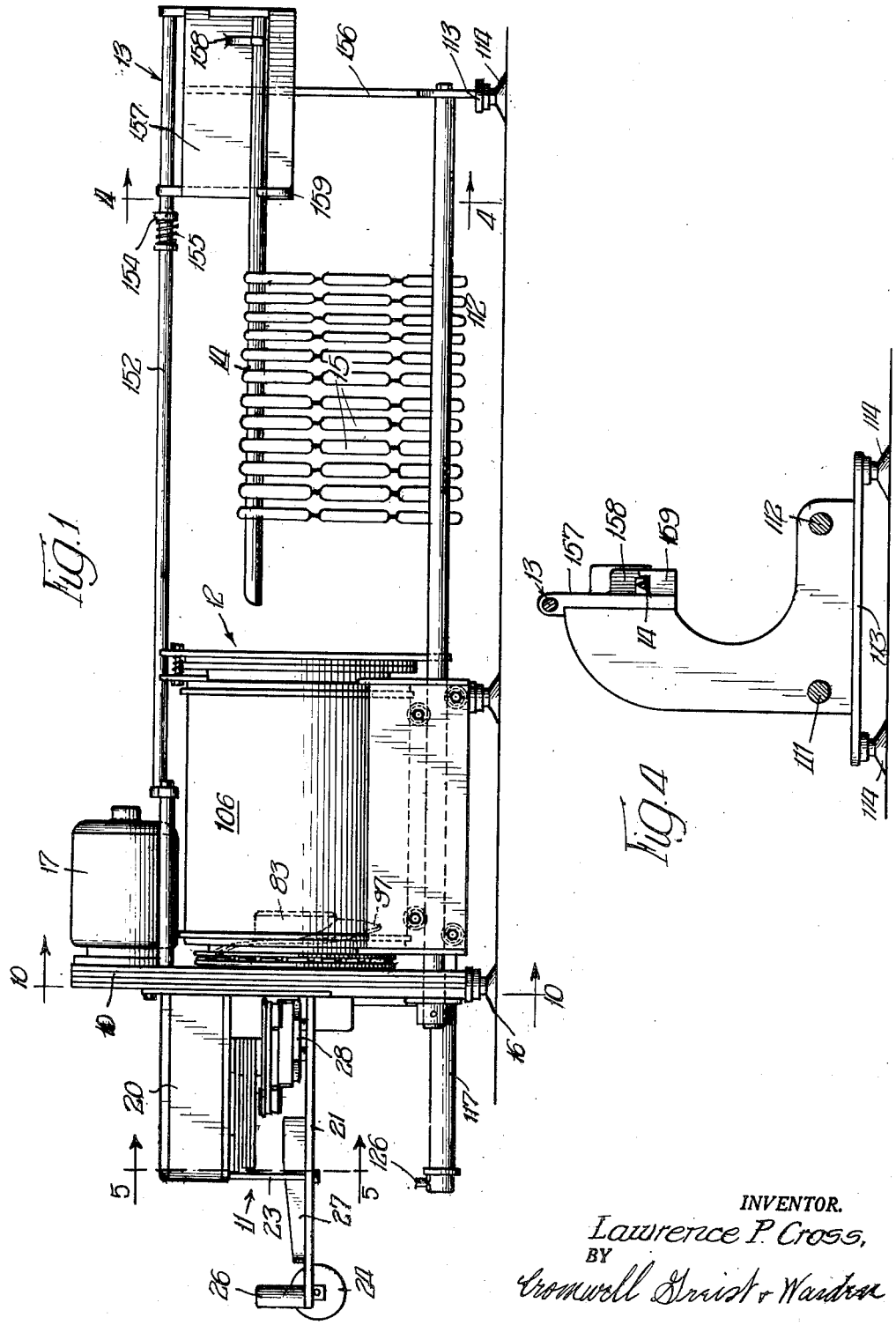
Fig. 1 is a side elevation of a machine embodying the principles of the invention.

Referring to the drawings, there is shown a mechanism constructed in accordance with the principles of the invention which will divide a continuous length of filled sausage casing into a plurality of links of predetermined length, which will successively rotate each link relative to the remainder of the filled casing to impart a twist between it and the next succeeding link, which will accumulate the twisted links in coil-like fashion in a receptacle and which will deposit the coil of links on a smoke stick for transfer to the smoke oven.

The illustrated mechanism comprises a frame structure including a transversely extending vertical supporting plate-like casing 10, a dividing mechanism 11 arranged on one vertical face or wall of the casing 10, a twisting and accumulating mechanism 12 extending from the opposite face of the casing 10 and a supporting rack 13 for a smoke stick 14. The smoke stick 14 is supported by the rack structure 13 in spaced relation to the twisting and accumulating mechanism 12 and in position to receive the connected link sausages, indicated at 15 in Fig. 1, as batches of the same are delivered to the rack by the accumulating mechanism 12, upon completion of the twisting operation.

The vertical supporting casing 10 rests on a pair of feet 16 and extends upwardly and laterally of the machine in a plane normal to the longitudinal axis of the same. It supports adjacent its upper edge on one face a motor 17 which is connected by gearing to the movable elements of the machine and which furnishes operating power for the same in a manner which will be described. The casing 10 is formed by a plurality of plates arranged in face abutting relation with the front and rear cover plates 18 and 19 spaced a sufficient distance to provide in cut-out portions of the intermediate plates a casing for the driving gears.

The casing dividing mechanism 11 which is supported on the front plate 18 of the casing 10 includes a horizontally extending gear box 20. The gear box or case 20 is secured by attaching brackets 20' and bolts 18' (Fig. 5) on the plate 18 and encloses the driving gears for the sausage dividing elements which are arranged beneath the same. The gear case 20 also supports the guide plate 21 (Figs. 1, 2 and 12) which extends in parallel spaced relation beneath the lower face of the same for supporting and guiding the stuffed sausage casing 22 to the dividing elements. The supporting plate 21 extends from the vertical plate 18 forwardly beyond the end face of the gear box 20 and is supported therefrom by depending hanger rods 23. A stuffed casing guide roller 24 is journaled in a recess 25 at the end of the plate 21 and side guide members 26 are provided which extend upwardly adjacent the ends of the guide roller 24. A pair of upstanding side guide plates 27 which are laterally spaced extend from adjacent the ends of guide roller 24 to a point spaced some distance short of the vertical plate 18. A pair of horizontally extending laterally spaced guide plates 28 are supported on pins 29 and arranged with their inner edges in generally parallel relation in the space between the ends of the upright guide plates 27 and the vertical plate 18. The ends of the guide plates 28 are located so that there is sufficient space between one of the ends thereof and the adjacent ends of the uprights 27 and between the other of the ends thereof and the vertical plate 18 to permit lateral movement of the dividing elements 31 which operate to constrict the stuffed casing and divide the same into the sausage links 15.

Figure 8:
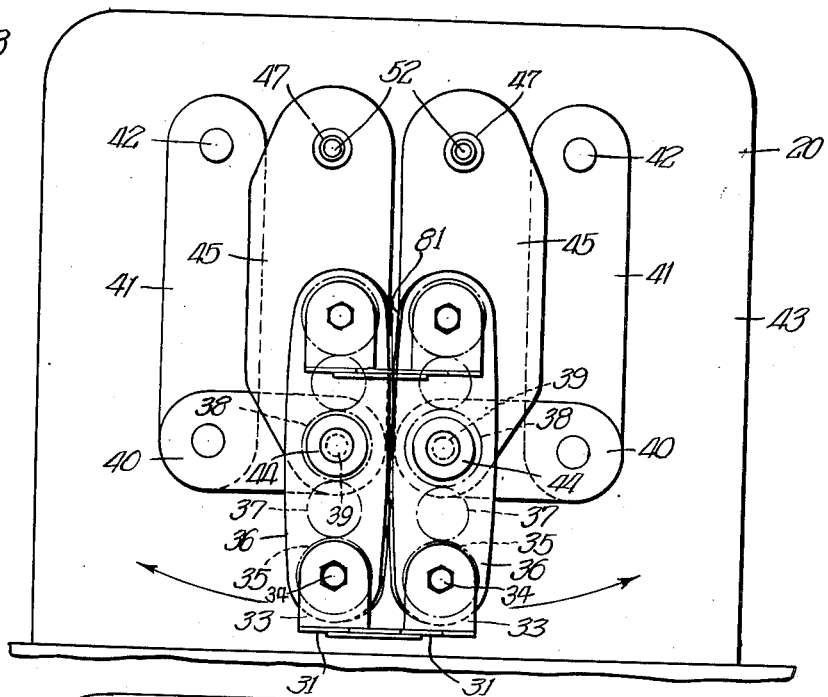
Fig. 8 is a sectional view taken generally on the lines 8—8 of Fig. 5 to approximately three-quarters scale.
Figure 9:
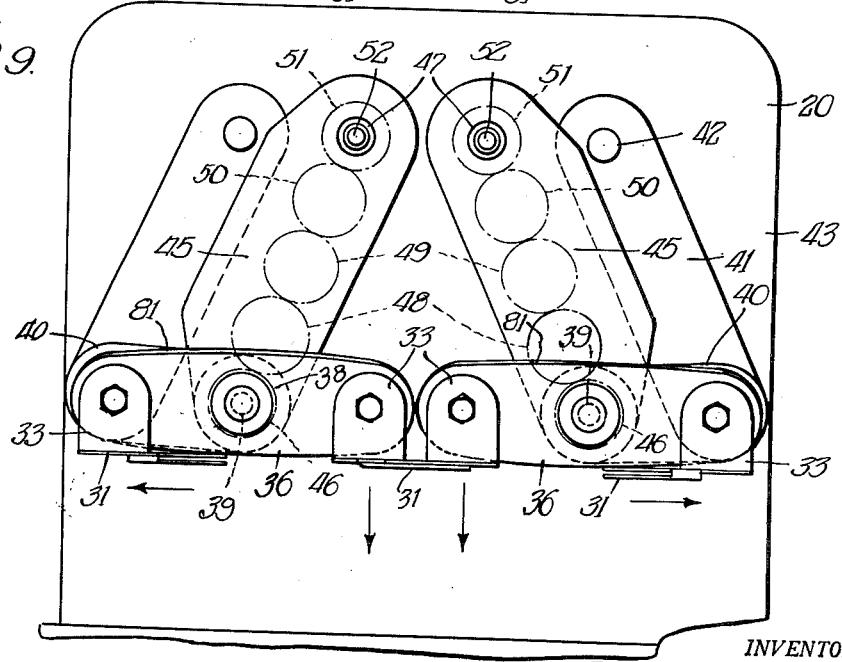
Fig. 9 is a view similar to Fig. 8 with the dividing heads in a different position.

The divider elements or gripper members 31 (Figs. 5, 8 and 9) which are arranged in two cooperating pairs comprise plate-like members having V-shaped slots 32 extending inwardly from their opposed edges. The V-shaped slots 32 divide the elements 31 into inner and outer finger-like portions which are in planes offset relative to each other in the respective pairs of elements 31 to permit them to move toward each other in interleaved relation engaging on opposite sides of the stuffed casing 22 when they are brought toward each other in the constricting operation and forming cooperating gripper members. The V-shaped dividing elements or fingers 31 are each provided with a flange 33 which is connected by a pivot 34 with a gear member 35 enclosed within the end of a generally rectangular head 36. The gears 35 are arranged at opposite ends of the heads 36 and are each connected in driving relation by idler gear 37 with a centrally arranged control gear 38 which is secured on a pin 39 extending through the upper outer wall of the head 36 and secured in fixed relation on one end of a relatively short control link 40. The other end of each link 40 is pivotally connected to one end of a somewhat longer link 41 which is secured in fixed relation at its other end to a pin 42 journaled in the lower wall 43 of the gear box 20.

Figure 6:
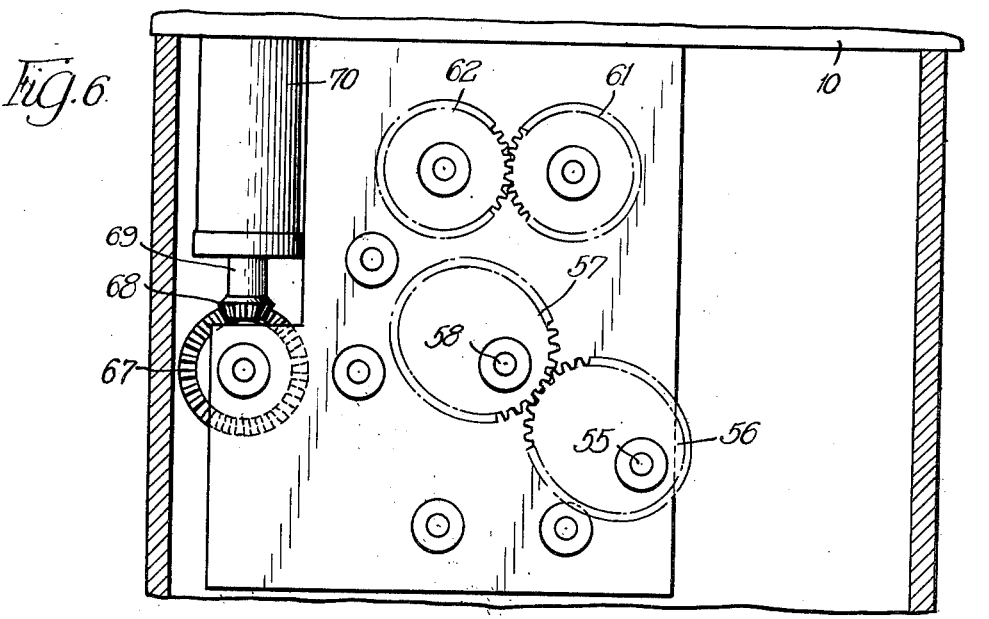
Fig. 6 is a section taken generally on the lines 6—6 of Fig. 5 to approximately three-quarters scale.
Figure 7:
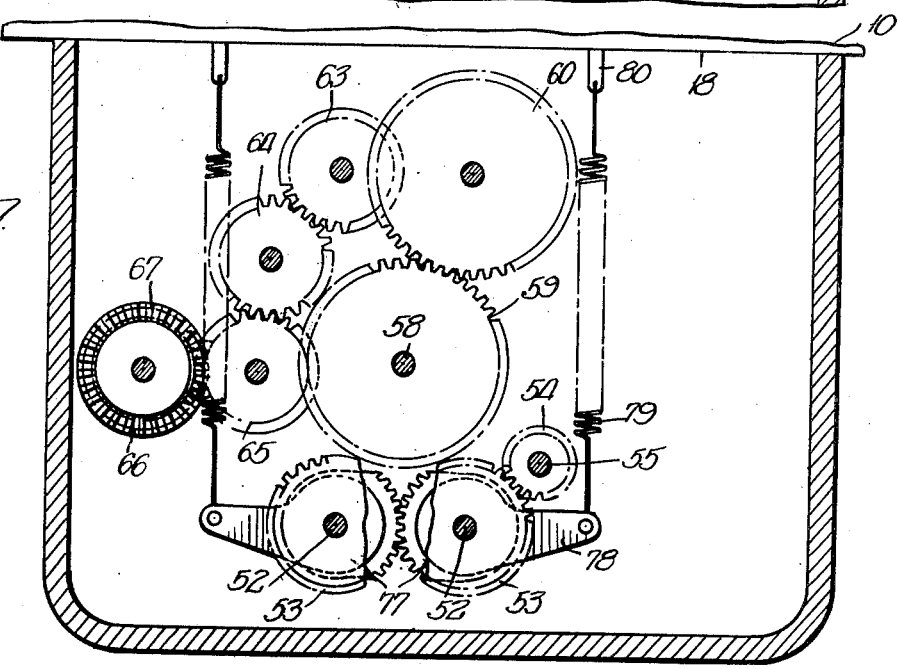
Fig. 7 is a section taken generally on the lines 7—7 of Fig. 5 to approximately three-quarters scale.
Figure 10:
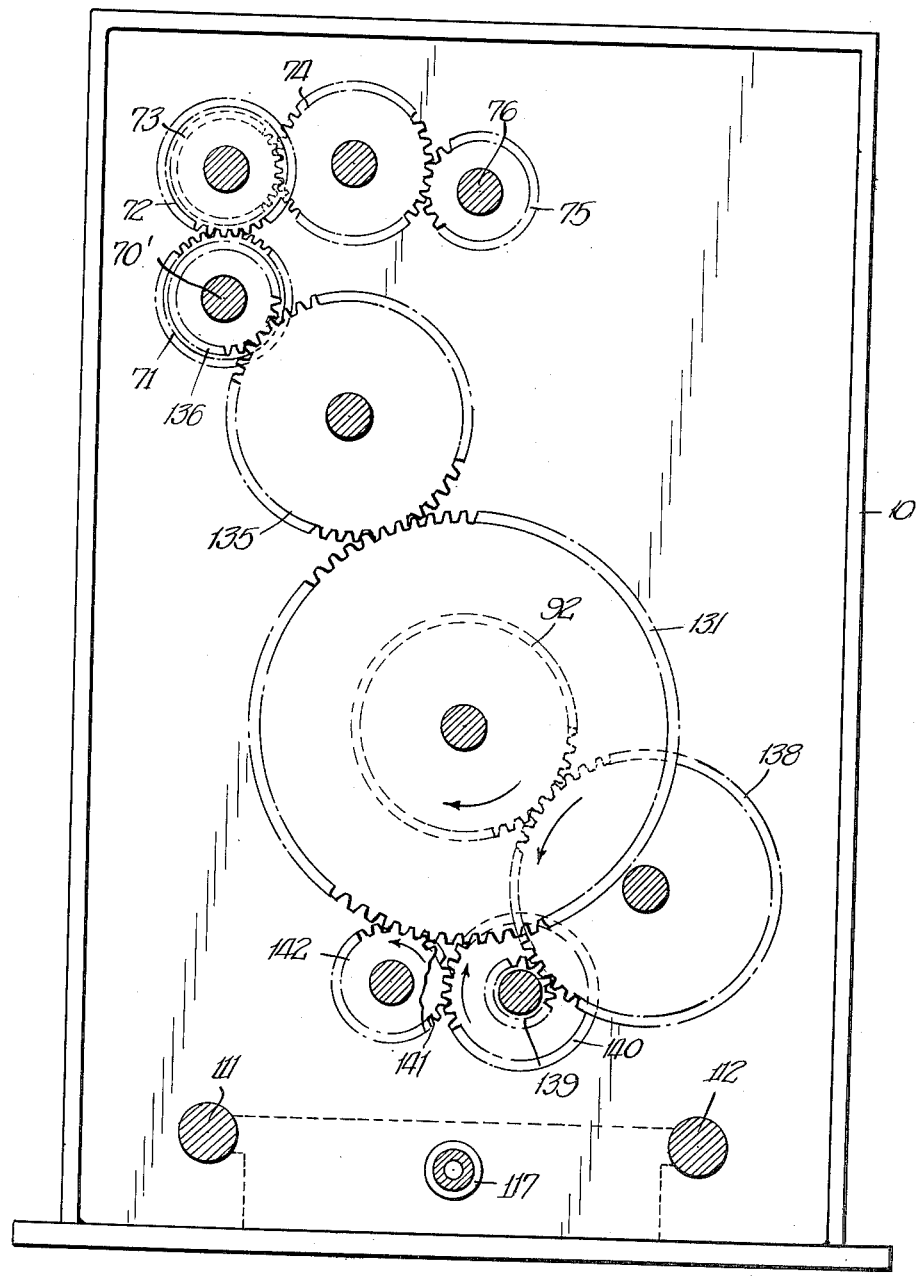
Fig. 10 is a section taken generally on the lines 10—10 of Fig. 1 to a scale enlarged approximately three times.

Each divider head 36 is rigidly secured at the center thereof to a flanged sleeve 44 which is journaled for rotation in one end of a head supporting arm 45. A gear 46 is secured on the sleeve 44 and enclosed within one end of the head supporting arm 45. The sleeve 44 surrounds the previously described pivot pin 39 and serves as a bearing for the same. The head supporting arms 45 are secured to bearing sleeves 47 at the other end thereof which are rotatably mounted in the lower wall 43 of the gear box 20. The head operating gear 46 of each arm 45 is connected by idler gears 48, 49 and 50 with a driving gear 51 which is secured on a shaft 52 extending upwardly through the bearing sleeve 47. The shaft 52 is rotatable relative to the bearing sleeve 47 to drive the gear 46 through the connecting gears 48, 49, 50 and 51. The shafts 52 extend into the gear box 20 and carry inner gears 53 (Fig. 7) which are in interengaging driving relation with each other and one of which engages in driving relation with a pinion 54 secured on one end of a rotatably mounted stub shaft 55 which carries at its other end one of a pair of interengaging elliptical gears 56 and 57 (Fig. 6). The other elliptical gear 57 is mounted on one end of a rotatably mounted stub shaft 58 which carries on its other end a relatively large gear 59. Gear 59 is connected in driving relation by a train of gears 60, 61, 62, 63, 64, 65 and 66 with a bevel gear 67. Bevel gear 67 is mounted on a stub shaft and driven by a bevel gear 68 on the end of the driven shaft 69 extending from a change-speed device 70. The change-speed device 70 is driven by means of a chain of gears (Fig. 10) 71, 72, 73 and 74 connecting with driving pinion 75 on the drive shaft 76 of the motor 17, the gear 71 being mounted on the shaft 70' extending into the change-speed device 70.

The head supporting arms 45 are connected to swing or pivot simultaneously by means of intermeshing gear segments 77 (Fig. 7) which are secured on the bearing sleeves 47 (Fig. 9) and within the casing 10. Each gear segment 77 is provided with an arm 78 which is connected to one end of a tension spring 79, the other end of the spring 79 being connected at 80 to the plate 18 of the casing 10. The gear segments 77 insure simultaneous movement of arms 45.

The supporting heads 36 for the dividing fingers 31 are provided with peripheral track-like formations 81 around the edges thereof which are in the same plane and have edgewise engagement with each other as the heads 36 rotate and which determine the path of movement of the divider elements 31. The track formations 81 are generally elliptical so that when the heads 36 rotate the divider elements 31 move toward each other rapidly and then gradually to the closed position. This movement is reversed when they move away from each other to the separated position.

The driving mechanism for rotating the supporting heads 36 causes the same to rotate with alternately increasing and decreasing speed due to the action of the elliptical gears 56 and 57 so that as the cooperating divider elements 31 approach engagement with the stuffed casing 22 the speed with which they are traveling is decreasing and when they separate and move away from engagement with the casing 22 the speed with which they are traveling is increasing. Due to the change in speed and the elliptical path of movement of the elements 31 there is a gradual constriction of the casing 22 as the elements approach the same and a rapid movement of the casing 22 forwardly as the dividing elements move the separated link 15 toward the twisting mechanism 12.

The twisting and accumulating mechanism 12 (Figs. 1, 2, 3, 11 and 12) extends longitudinally of the machine from the face 19 on the side of the casing or housing 10 opposite that on which the dividing mechanism 11 is mounted. The mechanism 12 comprises a longitudinally or axially reciprocable receptacle 82 for accumulating the links 15 and a twisting and distributing head 83 which is supported with a portion thereof extending through aligned apertures 84 and 85 in the front and rear plates 18 and 19, respectively, of the casing 10. The twisting and distributing head 83 comprises a relatively short cylindrical body portion 86 of substantial diameter which tapers exteriorly at one end to a portion 87 of reduced diameter. The portion 87 of the head 83 is centrally apertured and internally threaded to receive an externally threaded portion of an apertured plate or collar member 88. The collar member 88 extends through the aperture 84 in the plate 18 and is provided with a flange 89 positioned in overlapping relation to the edges of the plate 18 around the opening 84. A cone-shaped bearing supporting ring 90 surrounds and is secured between the tapered portion of the head 83 and the flange 89 of collar 88. Ring member 90 carries peripheral bearing member 91 and a ring gear 92. The bearing member 91 is supported in a bearing supporting ring 93 which is secured in fixed relation to an intermediate plate or member 94 within the casing 10. The ring gear 92 rotates the twisting head 83 and the attached collar member 88 relative to the casing 10.

The internal surface 95 defining the central aperture in the collar member 88 is provided with grooves which extend in an axial direction and are spaced around the periphery thereof. The twisting head 83 is provided with a passageway 96 beginning centrally of the reduced end 87 and forming a continuation of the central aperture 95 in the collar 88. The passageway 96 extends at an angle outwardly of the axis of the head portion 86 and terminates on the peripheral surface of the head portion 86. The passageway 96 is of a size somewhat larger than the maximum diameter of the sausages which are being formed and guide the same outwardly relative to the axis of the twisting head which is in alignment with the direction of travel of the stuffed casing as it is divided by the divider elements 31. The twisting head portion 86 is provided on its peripheral surface with a radially extending spiraled distributing flange or vane 97 which projects radially outwardly of the periphery and extends axially of the head portion 86 forming approximately a full turn about the periphery of the same. The ends of the flange 97 are axially spaced a sufficient distance to accommodate the opening forming the terminus of the passageway 96 which is located approximately between the same. The flange or vane 97 operates to position or distribute the completed sausages 15 in the accumulating receptacle 82 in a manner which will be described.

Figure 3:
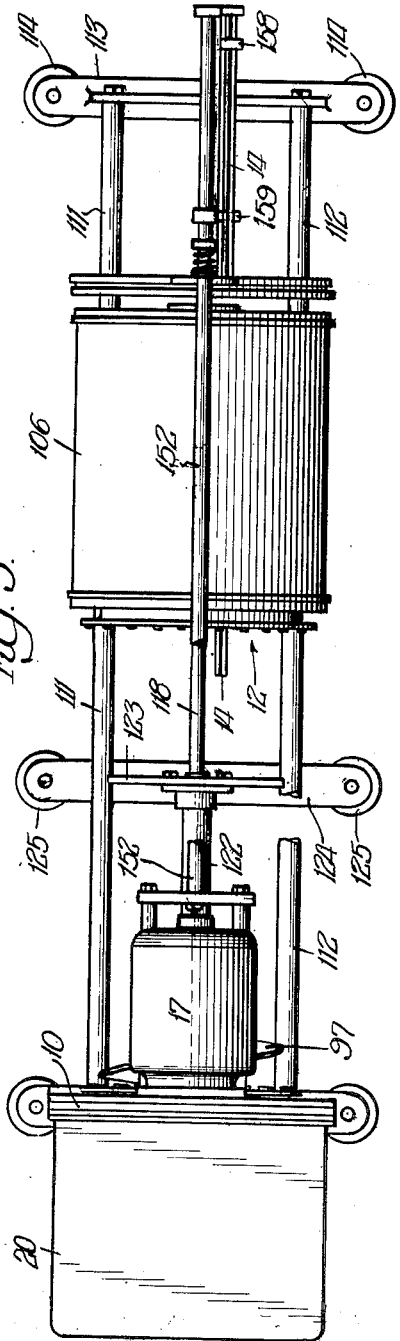
Fig. 3 is a plan view of the machine as shown in Fig. 2.

The receptacle 82 comprises an elongate open-ended tubular section having an internal diameter substantially greater than the cross-sectional diameter of the body portion 86 of the twisting head 83. The accumulating cylinder 82 is secured at its opposite ends within encircling front and rear band members 98 and 99 which are provided with trackway forming grooves 100 and 101, respectively, for receiving supporting rollers 102 and 103 which are rotatably mounted on inwardly extending ring formations 104 and 105 secured at oposite ends of a tubular outer casing member 106. The casing member 106 is provided at its ends with apertured plate members 107 and 108 through which the band members 98 and 99 extend. The end plate members 107 and 108 are secured at the bottom to vertical bottom plates 109 and 110, respectively, which are apertured at opposite sides of the machine for receiving in freely sliding relation supporting guide rods or rails 111 and 112 (Fig. 3). The guide rods 111 and 112 are secured at one end of the machine to a cross member 113 provided with suitable downwardly projecting feet 114 and at the opposite end to the casing 10 adjacent the bottom thereof. The guide rails 111 and 112 are parallel and support the casing 106 for reciprocal movement toward and from the casing 10. A plurality of rollers 115 are arranged in vertically spaced pairs on bottom side plates 116 which are provided at opposite sides of the casing 106 for engaging the guide rails 111 and 112 on opposite sides to support the casing 106 in freely sliding relation thereon.

The receptacle supporting casing 106 is reciprocated on the guide rails 111 and 112 by hydraulic mechanism 117 (Figs. 1, 2, 3 and 11) which comprises a piston member 118 which is secured at its outer end at 119 to a central depending portion 120 of the end plate 110. The piston 118 reciprocates in a fixed cylinder 122 which is supported adjacent one end by the lower portion of the casing 10 and at the other end by a cross bar 123 which extends between the guide rails 111 and 112 and which projects upwardly of a base member 124 having laterally spaced depending feet 125. The cross bar 123 is longitudinally spaced from the casing 10 a sufficient distance to permit the desired movement of the receptacle 82 between the casing 10 and the supporting structure 13 for the smoke stick 14 at the end of the machine. The hydraulic mechanism 117 is supplied with air or other fluid medium at the connections indicated at 126 and appropriate manually operated or automatic control mechanism (not shown) is provided to insure smooth and efficient movement of the receptacle toward and from the casing 10.

The supporting band 98 at the end of the receptacle 82 adjacent the casing 10 is provided with a radially extending peripheral flange 127 which is adapted to engage friction members 128 peripherally spaced around the margin of a rotatable centrally apertured ring or plate member 129. The ring or plate member 129 is mounted adjacent the outer face of the plate 19 of the casing 10 and is provided with a bearing supporting shoulder or band member 130 which extends into the casing 10 and carries a ring gear 131 operating in a recess provided in an intermediate plate member 132 of the casing 10. A bearing 133 is positioned between the band member 130 and the fixed bearing supporting member 93 which is secured to the intermediate plate member 94 in the casing 10. The ring gear 131 rotates the plate member 129 about the fixed bearing supoprt 93. The twisting head 83 extends through the central aperture 134 in the plate 129 with sufficient clearance between the members to permit relative rotation of the head 83 and plate 129. The plate 129 is located in a plane transverse of the machine adjacent the outer face of casing member 19 and slightly spaced from the end of the distributing vane 97 on the head 83.

The ring gear 131 (Fig. 10) is meshed with idler gear 135 which in turn meshes with pinion 136 on the shaft 70' extending from the change-speed device 70. Ring gear 92 is driven in the same direction as ring gear 131 but at a different speed by means of the connecting gear train 138, 139, 140, 141 and 142. All of the connecting gears are mounted in the casing 10 in suitable recesses provided in the intermediate plates 94 and 132. Rotation of the ring gear 131 revolves the plate 129 and through engagement of the friction members 128 with the flange 127 of the band member 98 causes rapid rotation of the accumulating receptacle 82 when the latter is positioned with the flange 127 in engagement with the friction members 128. The mounting of the receptacle 82 and the hydraulic control of the reciprocation of the casing 106 results in the receptacle 82 being rapidly rotated by the rotation of the plate 129 when at one end of its longitudinal movement and continuing to rotate rapidly and freely in the casing 106 when moved away from the plate 129 by operation of the hydraulic mechanism 117. With the receptacle 82 rapidly rotating freely therein the casing 106 is adapted to be reciprocated to the other end of its path of longitudinal movement.

At its forward end (Fig. 11) the casing 106 is provided with a braking mechanism comprising an end plate 143 apertured at 144 and positioned in slidable relation over the end of the receptacle 82. The braking plate 143 is adapted to engage a friction ring member 145 secured on the outer face of a radially extending flange 146 on the receptacle supporting band member 99 adjacent the end of the receptacle 82. The braking plate 143 is urged outwardly in non-engaging relation relative to the brake band 145 by a compression spring 147 mounted on a bolt 148 extending between the upper end of the plate 143 and an upstanding supporting plate 149 secured on the end plate 108 of the casing 106, the plate 143 being mounted for free sliding movement on the bolt 148 against the force of the spring 147. The plate 143 is provided with a top groove 150 and plate 149 is provided with a similar groove 151 for receiving in guiding relation a top bar or rod member 152 which extends from the motor support 153 adjacent the housing 10 to the upstanding end frame structure 13. The rod 152 is provided adjacent the frame structure 13 with a stop member 154 which includes a cushion spring 155 and which is engaged by the plate 143 as the hydraulic mechanism 117 moves the receptacle 82 toward the frame 13, the stop 154, 155 functioning to move the plate 143 against the brake ring 145 to stop the free rotational movement of the receptacle 82.

The frame 13 for supporting the stick 14 comprises an end plate 156, which projects upwardly from the bottom end cross plate 113, and a longitudinally extending vertically positioned supporting plate 157. Longitudinally spaced top and bottom bracket members 158 and 159 extend vertically of the supporting plate 157. Both bracket members 158 and 159 are grooved at the bottom and top, respectively, to receive and support in position longitudinally of the machine the smoke stick 14 with the major portion of the stick 14 projecting toward the receptacle 82 and located relatively close to the longitudinal axis of the same so that when the receptacle 82 is moved toward the stick supporting structure 13 the stick 14 projects into the receptacle 82 substantially the full length of the receptacle 82 in position for receiving the sausage links 15 when they are released from the action of centrifugal force by stopping the receptacle 82.

The operation of the machine to divide a stuffed casing into individual sausage links and after providing a twist between the respective links depositing the same on a smoke stick in position for further processing is as follows: The stuffed sausage casing 22 is fed over the guide roller 24 and between the side guide plates 27 into position for engagement by the divider elements 31 on the divider heads 36. The divider heads 36 are rotated by the driving mechanism to bring the cooperating pairs of divider elements 31 from opposite sides of the path of travel of the casing 22 into constricting relation with the same to separate the material in the casing at spaced points and provide a constricted area between the individual sausage links thus formed. As the heads 36 rotate, the pair of dividers 31 which has been brought into constricting relation with the casing moves forwardly along a longitudinal path and delivers the link which has been formed into the grooved aperture 95 in the twisting head 83 and through the passageway 96 in the body 86 of the head 83. The rotation of the head 83 causes the formed link to revolve axially and impart a predetermined number of twists in the area between the link in the passageway 96 and the next succeeding link which is being formed by the dividers 31. The dividers 31 which carry the formed link forwardly separate with increasing speed as they reach the end of the longitudinal movement adjacent the collar member 88 of the twisting head 83.

Figure 2:
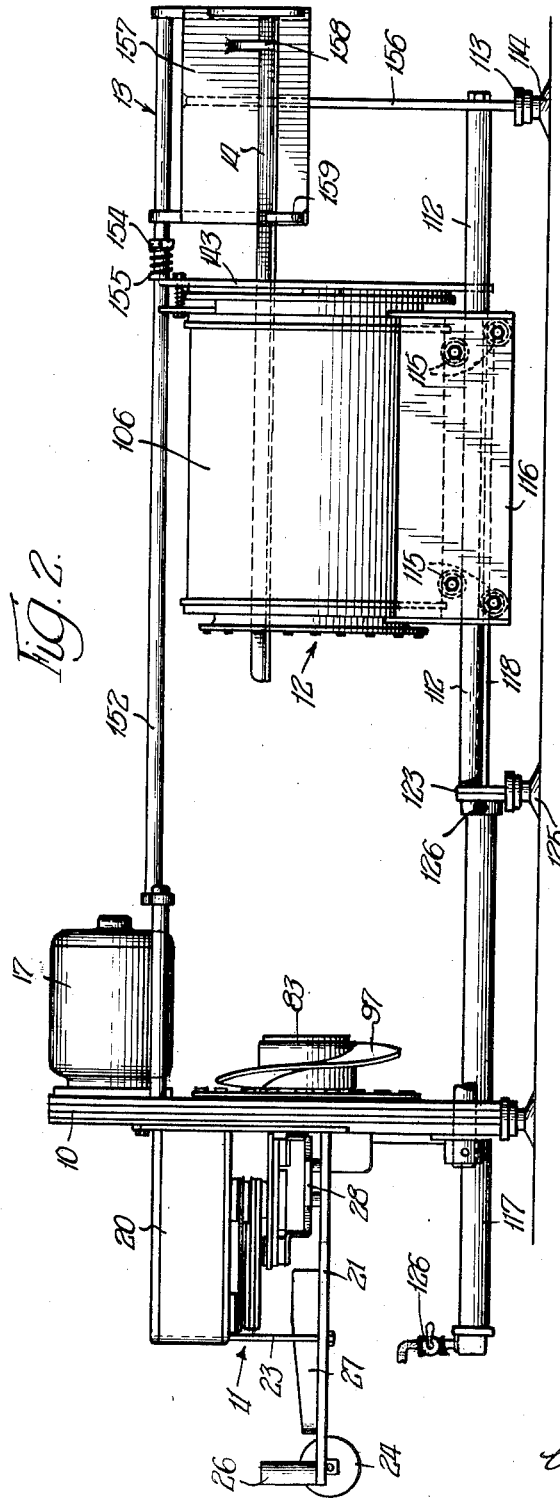
Fig. 2 is a side elevation similar to Fig. 1 but showing a different stage in the operation of the machine.

As the individual sausages 15 move through the passageway 96 they are carried by centrifugal force against the interior surface of the receptacle 82 which is also revolving rapidly in the same direction as the twisting head 83 but at a speed somewhat slower. The distributing vane 97 on the twisting head 83 guides or distributes the completed links 15 in the receptacle 82 so that the connected links 15 are arranged in single coil-like fashion around the interior periphery of the receptacle 82. The coil of links which is formed is moved ahead in the receptacle 82 by the distributing vane 97 as each successive link is formed. The receptacle 82 is provided with longitudinally extending grooves 160 circumferentially spaced around the interior of the receptacle 82 and the surface of the receptacle is kept moist so that the coil of sausages will move in the receptacle 82 without sticking to the walls of the same. When the length of casing 22 is completely divided and the sausages 15 are all twisted, the hydraulic mechanism 117 is operated either manually or by suitable automatic means (not shown) to move the carriage 106 away from the rotating plate 129 to disconnect the drive for the same. With the receptacle 82 rotating freely therein the casing 106 is moved to the other end of its path to bring the receptacle 82 over the stick 14 which is supported on the plate 157 and to actuate the braking mechanism 154, 155 for stopping the receptacle 82. When the rotation of the receptacle 82 is stopped the coiled links 15 are released from the action of centrifugal force which holds them against the wall of the receptacle 82 while the latter is rotating, to drop onto the stick 14 in position for removal to a smoke oven for further processing. The mechanism may be adjusted by use of gears of the proper size to provide for proper coiling of the sausages in the receptacle 82 without crowding or pulling and in position so that when the coil is discharged or dropped onto the stick 14 the connected links hang therefrom in a multiplicity of depending coils each containing the same number of links as indicated in Figure 1.

I claim:

1. In a sausage linking machine, a supporting structure having guideway forming elements for directing a filled sausage casing along a predetermined path thereon and cooperating casing engaging means mounted on said supporting structure for forming successive sausage links and continuously advance said formed links, mechanism arranged on said supporting structure in the path of movement of said links and adjacent said guideway forming elements for twisting each successive link and for accumulating the connected links in coil-like fashion, said mechanism including an apertured plate mounted on said supporting structure and extending transversely of the path of movement of said links, a generally cone-shaped member rotatably mounted in the aperture in said supporting plate and having an internal passageway extending axially and radially therein for receiving the sausage links from said casing engaging means, said cone-shaped member having a screw-like flange formation on the periphery thereof, a cylindrical receptacle rotatably mounted on said supporting structure in encompassing relation to said flange formation on said cone-shaped member, drive means associated with said cone-shaped member for rapidly rotating said cone-shaped member, and drive means associated with said receptacle for rotating said receptacle in the same direction.

2. In a sausage linking machine as recited in claim 1 wherein said receptacle and its drive means are separable and wherein said receptacle is mounted for free rotation when separated from its drive means.

3. A sausage linker comprising a supporting frame, guard members mounted on said frame for directing a continuous length of filled sausage casing along a linear path, a pair of arms swingably mounted at one end on said frame, a pair of divider heads rotatably mounted on the free ends of said arms and arranged for movement on opposite sides of said path, said divider heads being generally rectangular in shape and having peripheral track forming portions in engagement with each other, drive means connected to said heads for rotating the same in opposite directions with alternately increasing and decreasing speeds, and cooperating divider elements rotatably mounted on said divider heads at points adjacent the opposite ends thereof, each of said divider elements having a plate-like portion provided with a slot and said plate-like portion being movable by rotation of said divider heads into cooperative casing restricting relation with the corresponding portion of a divider element on the opposite divider head whereby to constrict the sausage casing to a relatively small area defined by said slots.

4. A sausage linker as recited in claim 3 and means connected to said divider elements for controlling the rotation thereof relative to said head whereby to bring the plate-like portions of cooperating pairs of said divider elements into generally parallel and overlapping engagement as they approach each other upon rotation of said divider heads.

5. A sausage linker as recited in claim 3 and means connected to the divider elements for controlling the rotation thereof comprising a swinging link having interengaging gears thereon which maintain the plate-like portions thereof normal to the path of movement of the sausage casing while permitting the divider elements to be moved toward and from the casing upon rotation of the divider heads.

6. A sausage linker as recited in claim 3 and outwardly bowed portions on the peripheral track formations on the divider heads whereby to vary the movement of said divider elements toward and from the sausage casing.

7. A sausage linker comprising an elongate generally horizontal supporting frame, a horizontal support plate at one end of said frame, guard members on the top of said horizontal support plate defining a pathway for receiving a continuous length of filled sausage casing, a gear box supported in spaced relation above said horizontal support plate, a casing dividing mechanism on said gear box comprising a pair of elongate arm members pivoted at one end on the bottom face thereof, divider heads rotatably mounted on the other ends of said arm members, divider elements on said divider heads, and means for rotating said divider heads in timed relation to bring successive divider elements on the respective heads into cooperative casing engaging relation whereby to divide the casing into links as it moves along in said pathway, a supporting plate structure extending vertically of said frame and adjacent said casing dividing mechanism, said plate structure having an aperture therein for receiving the successive links, a generally cone-shaped member rotatably supported in the aperture in said vertical plate structure, said cone-shaped member having an axially and radially extending link accommodating passageway therein and a radially extending spiral blade on the peripheral surface thereof, a cylindrical link accumulating member, a carriage movable longitudinally of the horizontal supporting frame and means to support said cylindrical member thereon for rotation about its axis, said carriage being adapted to be positioned with the forward portion of said cone-shaped member extending within the rearward end of said cylindrical member, means to rotate said cone-shaped member and said cylindrical member in timed relation whereby a twist is imparted between each of the links and the next succeeding link and the twisted links are deposited in coil formation in said cylindrical member, means to move said cylindrical member longitudinally of said supporting frame a predetermined distance toward the other end of said frame while the cylinder continues to rotate and means on the other end of said frame forming a support for a smoke stick in horizontal position extending longitudinally of the frame whereby a smoke stick supported thereon will receive the coil of connected sausage links as said cylindrical member reaches the end of its forward movement and rotation thereof is discontinued.

8. In a machine for linking sausages and delivering the same to a supporting stick, an elongate supporting frame, means at one end of said frame for continuously guiding a filled sausage casing in a predetermined path, means on said frame arranged along the path of travel of the casing for gripping the same at intervals to divide the casing into individual links of predetermined length, an open-ended tubular container adjacent said gripping means, means reciprocably supported on said frame for rotatably mounting thereon said container in spaced relation to said gripping means for temporarily accumulating the connected links, said container being mounted for rotation in a plane extending transversely of the frame and of the path of travel of the links, said container mounting means being reciprocable in the direction of the path of travel of the links, means rotatably mounted on said frame and cooperating with said gripping means and said container for imparting a twist between each link and the next succeeding link, and means at the other end of said frame for supporting a stick for receiving the twisted links from said accumulating container when said container mounting means is reciprocated away from said gripping means to a position adjacent said stick supporting means.

9. A sausage linker comprising an elongate horizontal supporting frame, a vertically extending transverse supporting plate structure intermediate the ends of said supporting frame, a horizontal plate extending from said transverse plate structure toward one end of said frame, guard members on the top of said horizontal plate defining a pathway for receiving a continuous length of filled sausage casing, a gear box extending from said transverse plate structure in spaced relation above said horizontal plate, a casing dividing mechanism on the bottom face of said gear box comprising a pair of elongate arm members pivoted at one end thereto, elongate divider heads rotatably mounted intermediate their ends on the free ends of said arm members, divider elements rotatably mounted on the ends of said divider heads, means for rotating said divider heads in timed relation, and means controlling the rotation of said divider elements whereby to bring successive pairs of divider elements into cooperating casing engaging relation and to divide the casing into links as it moves along in said pathway, said transverse plate structure having an aperture for receiving the successive links, a generally cylindrical member rotatably supported in the aperture in said vertical transverse plate structure, said cylindrical member having an axially and radially directed link accommodating passageway therein and a radially extending spiral blade on the peripheral surface thereof, a hollow cylindrical link accumulating receptacle open at both ends, a carriage mounted for movement longitudinally of said supporting frame and means to support said receptacle thereon for rotation about its axis, said carriage being adapted to be positioned with the forward end of said cylindrical member projecting within the open rearward end of said receptacle, means to rotate said cylindrical member and said receptacle in timed relation whereby a twist is imparted between each of the connected links and the next succeeding link as the links move from said dividing mechanism through said cylindrical member and the twisted links are accumulated in coil formation in said receptacle, means to move said receptacle longitudinally of said supporting frame a predetermined distance toward the other end while it is rotating and means on the other end of said frame to support the coil of connected sausage links as said receptacle reaches the end of its forward movement and rotation about its axis is discontinued.

10. In a sausage linking machine, means for guiding a filled sausage casing along a predetermined path, cooperating gripper members mounted on opposite sides of the path of travel of the casing, means to move said gripper members in a closed path whereby said gripper members engage the casing at spaced points and form therein successive sausage links of uniform length, mechanism arranged adjacent said gripper members for twisting each successive link as it moves away from said gripper members and for accumulating the twisted links in coil formation, said mechanism including an apertured support extending transversely of the path of travel of the casing adjacent said gripper members, an apertured member rotatably mounted in the aperture in said support, a spiral flange formation on the outer periphery thereof, a cylindrical receptacle extending from said apertured support in encompassing relation to said spiral flange formation, and means for rapidly rotating said apertured member and said receptacle about the cylindrical axis of said receptacle in the same direction but at different speeds, whereby the successive links are twisted and guided by the spiral flange formation into coiled relation on the interior wall of the cylindrical receptacle.

11. In a sausage linking machine as recited in claim 10 wherein said apertured member is provided with relatively shallow spaced axial grooves extending inwardly from the edge of the aperture therein.

12. In a sausage linking machine as recited in claim 10 wherein said receptacle is mounted for bodily movement in an axial direction away from said apertured member.

13. A sausage linker comprising a supporting frame, guide members on said frame for directing a continuous length of filled sausage casing along a linear path, cooperating divider elements arranged on opposite sides of said path, said divider elements being mounted on rotatable supporting heads, said supporting heads being rotatably mounted on supporting arms and said arms being pivotally mounted on said frame, means connected to said arms for urging the same toward each other to hold said heads in peripheral engagement, and drive means connected to said heads for rotating said heads to bring the divider elements on the heads into cooperative casing encompassing relation, said drive means including cooperating elliptical gears whereby said heads rotate with alternately increasing and decreasing speed.

14. In a sausage linking machine, means for guiding a filled sausage casing along a predetermined path, means along the path of travel of the casing to engage the casing and form therein successive sausage links, and mechanism adjacent said casing engaging means for twisting each successive link as it moves away from said casing engaging means and for accumulating the twisted links, said mechanism including an apertured supporting plate mounted transversely of the path of movement of the casing, a generally cylindrical member having a peripheral flange on the outer surface thereof rotatably mounted in the aperture in said supporting plate and extending therefrom in the direction of forward movement of said casing, said cylindrical member having an internal passageway extending axially and radially thereof for receiving the successive formed links and for guiding said links radially outwardly thereof, a generally cylindrical hollow receptacle rotatably mounted on said supporting plate and in encompassing relation to the extending portion of said cylindrical member, the inner wall of said receptacle being slightly spaced from the periphery of the flange on said cylindrical member and drive means associated with said cylindrical member and said receptacle for rapidly rotating said cylindrical member and said receptacle about the cylindrical axis thereof and in the same direction whereby each successive link is twisted as it moves through the internal passageway of said cylindrical member and is deposited on the inner wall of said receptacle in single coil formation.

15. In a sausage linking machine as recited in claim 14 wherein said axially and radially extending passageway in said cylindrical member is provided with relatively shallow circumferentially spaced axially extending grooves at the entrance thereto.

16. In a sausage linking machine as recited in claim 14 and means mounting said receptacle for movement in an axial direction away from said cylindrical member.

17. In a sausage linking machine having means for guiding a filled sausage casing along a predetermined path and cooperating casing engaging means mounted along the path of travel of the casing for forming therein successive sausage links, mechanism arranged adjacent said casing engaging means and in the path of movement of said links for twisting each successive link, said mechanism including an apertured supporting plate extending transversely of said path, an apertured member rotatably mounted in the aperture in said supporting plate and having an outwardly flared spiral flange portion on the outer periphery thereof, a cylindrical receptacle rotatably mounted adjacent said supporting plate and in encompassing relation to said flange portion of said apertured member, drive means operatively associated with said apertured member for rapidly rotating said apertured member, and drive means operatively associated with said receptacle for rotating said receptacle in the same direction.

18. In a sausage linking machine having means for continuously advancing a filled sausage casing along a predetermined path and cooperating means for gripping the casing at intervals to divide the same into successive individual links of predetermined length, an open-ended cylindrical container, means mounting said container for rotation about its cylindrical axis and for bodily movement away from said casing gripping means, said container having one end positioned adjacent said casing gripping means for receiving the connected links, means associated with said container for rapidly rotating said container about its cylindrical axis, and twisting and distributing mechanism rotatably mounted at the end of said container adjacent said casing gripping means for receiving the successive links from said casing gripping means and means for rapidly rotating said twisting and distributing mechanism whereby said twisting and distributing mechanism cooperates with said rapidly rotating container to impart a twist in the area between successive links and position the twisted links in single coil-like fashion in said container.

19. In a sausage linking machine having means for guiding a filled sausage casing along a predetermined path and cooperating means mounted along the path of travel of the casing for engaging the casing at spaced points and for forming successive links in the casing, mechanism adjacent said casing engaging means for twisting each successive link and for accumulating the twisted links in coil formation, said mechanism including a centrally apertured supporting plate extending transversely of the path of movement of the casing, an apertured member rotatably mounted in the aperture in said supporting plate for receiving the links therethrough, a radially extending spiral flange formation on said apertured member, a receptacle for the links rotatably mounted adjacent said apertured supporting plate and in encompassing relation to said spiral flange formation, and drive means connected with said apertured member and with said receptacle for rapidly rotating said apertured member and said receptacle in the same direction.

20. In a machine for linking sausages and delivering the same on a smoke stick, an elongate supporting frame, means at one end of said frame for continuously feeding a filled sausage casing, means on said frame along the path of travel of the casing for gripping the same at intervals and for dividing the casing into individual links of predetermined length, an open-ended container rotatably mounted on said frame adjacent said gripping means for receiving the connected links, means associated with said container for rapidly rotating said container in a plane transversely to the path of travel of the links, said gripping means and said container having means cooperating therewith to impart a twist between each link and the next succeeding link and to arrange the twisted links in coil formation within said container, means at the other end of said frame and in spaced relation to said container adapted to support a smoke stick in a position generally parallel with the axis of rotation of said container, and means associated with said container for reciprocating said container bodily between a position in which it receives the connected links and a position adjacent said smoke stick supporting means and in encompassing relation to a smoke stick supported thereon.

21. In a sausage linking mechanism, means for advancing a stuffed sausage casing in a predetermined path, means for dividing the casing into successive links as the casing advances, a fixed support member in the path of movement of the casing and having a relatively small opening therein forming a passageway for receiving the links therethrough, a rotatable throat member associated with said opening and having an axially and radially directed passageway for the links which is slightly greater in cross sectional diameter than the cross sectional diameter of the links, a cooperating cylindrical link accumulating container arranged adjacent the support member with its longitudinal axis aligned with the opening in said support member, said cylindrical container being mounted for rotation about its longitudinal axis and for linear movement in the direction of its longitudinal axis, means for rotating said throat member and said container simultaneously and means for imparting linear movement to said container.

22. In a sausage linking mechanism, means for advancing a stuffed sausage casing along a predetermined path, means for dividing the casing into successive links as the casing advances, a support member extending across the path of movement of the casing adjacent said dividing means, said support member having a relatively small opening therein forming a passageway for receiving the links therethrough, a throat member rotatably associated with said opening, said throat member having an axially and radially directed passageway through which the links are advanced, said passageway being slightly greater in cross sectional diameter than the cross sectional diameter of the links, a cylindrical container rotatably mounted adjacent said support member with its longitudinal axis aligned with the opening in said support member, said cylindrical container being also mounted for linear movement in the direction of its longitudinal axis and of the advancing movement of the links, drive means for rotating said throat member and said cylindrical container to impart a twist between each link and the next succeeding link as the links are delivered through the passageway in said throat member and to arrange the links in coil formation within said cylindrical container and means for imparting linear movement to said cylindrical container in the direction of its longitudinal axis toward and from said support member, to permit removal of the twisted links in coiled formation from the cylindrical container.

23. In a sausage linking mechanism, means for advancing a stuffed sausage casing in a predetermined path, means for dividing the casing into successive links as the casing advances, a support member extending across the path of movement of the casing, said support member having a relatively small opening therein forming a passageway for receiving the links therethrough, a rotatable throat member mounted on said support member, said throat member having an axially and radially directed passageway for the links, said passageway being slightly greater in cross sectional diameter than the cross sectional diameter of the links, a cylindrical container rotatably mounted adjacent the support member with its longitudinal axis extending in the direction of advancing movement of the links, said cylindrical container being also mounted for linear movement in the direction of its longitudinal axis, said cylindrical container being initially positioned with the throat member extending into one end thereof, means for rotating the throat member and the container at relatively high speeds to draw the links through the passageway in said throat member and to impart a twist between each link and the next succeeding link, said throat member having means for distributing the twisted links in coil formation within said cylindrical container, and means for imparting linear movement to said cylindrical container to deliver the coiled links for removal therefrom at a point spaced from said throat member.

24. In a sausage linking mechanism as recited in claim 23 and said link distributing means comprising a radially projecting spiral flange formation on the periphery of said throat member forming a spiral guide channel for the twisted links and said passageway in the throat member terminating at its outer end in said guide channel.

25. In a sausage linking mechanism as recited in claim 23 and said link distributing means comprising a peripheral outwardly opening spiral channel formation on said throat member which communicates at its inner end with the passageway in the throat member.

26. In a sausage linking mechanism, an elongate supporting frame, means at one end of the supporting frame for advancing a stuffed sausage casing in a predetermined path toward the other end of the supporting frame, means for dividing the casing into successive links as the casing advances, a support member extending transversely of the supporting frame adjacent the dividing means and having a relatively small opening therein forming a passageway for receiving the links therethrough, a rotatable throat member mounted in said opening having an axially and radially directed passageway for the links, a cylindrical link receiving container, means on the supporting frame mounting said container for rotatable movement about its longitudinal axis to position the links in coil formation within said container, said container mounting means being movable toward and from the other end of said supporting frame, and means at the other end of said supporting frame for receiving the links from said container when it is moved to said end of said supporting frame.

27. In a machine for forming a length of a stuffed casing into short serially connected links, a tubular container in which the connected links accumulate, means for supporting the container and rotating the same on its axis at a high speed during the formation of the links to cause the links to arrange themselves in an open coil about the inner periphery of the container and remain in such position under the action of centrifugal force, said links being released from their coiled engagement with the inner periphery of the container upon the speed of the container being reduced, a member mounted adjacent the container for receiving the coil of links as a unit following their release from engagement with the container, and means associated with the member and the container for moving the container and the member relative to each other to dispose the member within the coil of links in the container prior to the release of the coil from engagement with the inner periphery of the container whereby when the speed of rotation of the container is reduced the coil of links will be deposited in suspended relation on the member.

28. In a machine for forming a length of stuffed casing into a plurality of short connected links, means for dividing the casing into portions of uniform length and for constricting the casing between the divided portions to form successive links, a cylindrical receptacle rotatably mounted adjacent said dividing and constricting means for accumulating the connected links therein, means cooperating with said dividing and constricting means and with said receptacle for imparting a twist in the constricted casing section between each link and the next succeeding link and for delivering the links within the receptacle, means for rotating said receptacle about its axis at a high speed during the formation and delivery of the links, whereby the links are caused by the action of centrifugal force to arrange themselves in open coil formation in engagement with the inner periphery of said receptacle and to remain in such position under centrifugal force until the speed of rotation of said receptacle is reduced sufficiently to release the coil from engagement with said receptacle, a member mounted adjacent said receptacle for removing the coil of links from said receptacle, and means operatively associated with said member and said receptacle for moving said member and said receptacle relative to each other to position said member within the coil of links while said receptacle is rotating at high speed whereby to deposit the coil of links in suspended relation on said member upon the speed of rotation of said receptacle being reduced.

29. In a sausage linking machine, a supporting frame structure, means on said frame structure for continuously feeding a filled sausage casing in a predetermined path, casing constricting members cooperating with said casing feeding means to engage the casing at intervals and divide the same into individual links of predetermined length, a tubular container rotatably mounted on said frame structure and positioned to receive the connected links, said container having a plurality of longitudinal groove formations on its internal surface, means operatively connected with said container for rapidly rotating said container about its axis, twisting and distributing mechanism rotatably mounted on said frame structure adjacent one end of said container for cooperation with said casing constricting members and said container to impart a twist in the area between each link and the next succeeding link and to deposit the twisted links in coil formation on the internal surface of said container.

30. In a sausage linking machine, a supporting frame structure, means on said frame structure for continuously feeding a filled sausage casing in a predetermined path, means mounted on said frame structure adjacent said casing feeding means and operative in the path of travel of the casing for constricting the same at intervals to divide the casing into individual links of predetermined length, a container mounted on said frame structure and positioned relative to said casing constricting means for receiving the connected links therefrom, means operatively connected with said container for rotating said container in a plane extending transversely of the path of movement of the links, means operatively connected with said container for moving said container along its axis of rotation, and twisting means arranged on said supporting frame for cooperation with said casing constricting means and said container to impart a twist between each link and the next succeeding link and to deposit the links in coil formation in said container, said twisting means comprising a throat ring rotatably mounted on said frame structure and a distributor member connected to said throat ring, said distributor member having a passageway extending at an angle to the axis of rotation of said throat ring and providing an angled path for the links from said casing constricting means to said container.

References Cited in the file of this patent

UNITED STATES PATENTS

| Number | Name | Date |
| --- | --- | --- |
| 1,545,586 | Kruse | July 14, 1925 |
| 2,229,590 | Popp | Jan. 21, 1941 |
| 2,325,769 | Haag | Aug. 3, 1943 |
| 2,356,099 | Swoboda, Sr. | Aug. 15, 1944 |
| 2,477,031 | Armbrust | July 26, 1949 |
| 2,492,222 | Jacobson | Dec. 27, 1949 |

FOREIGN PATENTS

| Number | Country | Date |
| --- | --- | --- |
| 20,096 | Great Britain | Sept. 3, 1912 |